April 10, 1962  R. S. WILLIS  3,029,093
PIPE COUPLING EMBODYING FLUID PRESSURE ACTUATED LOCKING MEANS
Original Filed Nov. 20, 1953
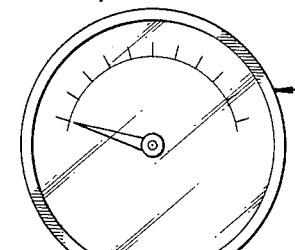
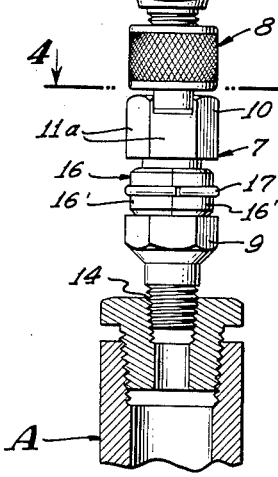
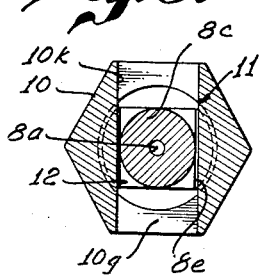
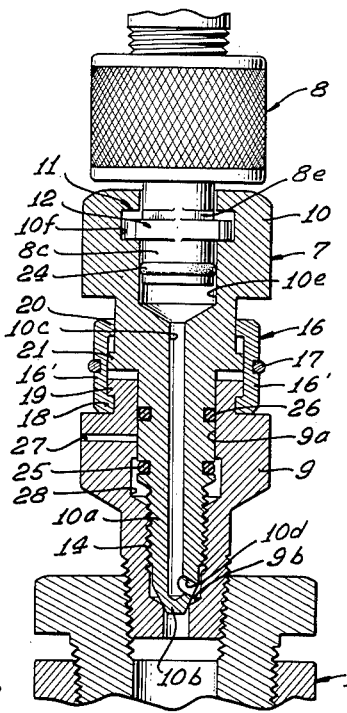
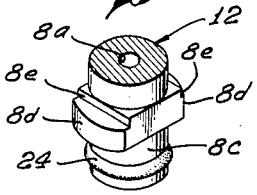
INVENTOR.
BY Paul A. Weilein
ATTORNEY.

United States Patent Office 3,029,093
Patented Apr. 10, 1962

3,029,093
PIPE COUPLING EMBODYING FLUID PRESSURE ACTUATED LOCKING MEANS
Robert S. Willis, Long Beach, Calif., assignor, by direct and mesne assignments, of 98¾ percent to Willis Oil Tool Co., a corporation of California, and 1¼ percent to Elmer L. Decker, Long Beach, Calif.
Original application Nov. 20, 1953, Ser. No. 393,378, now Patent No. 2,823,699, dated Feb. 18, 1958. Divided and this application June 3, 1957, Ser. No. 663,293
3 Claims. (Cl. 285—81)

This application is a division of my copending application, Serial No. 393,378, filed November 20, 1953, and now Patent 2,823,699.

The present invention relates to couplings for effecting a detachable connection between conduits or vessels containing fluid under pressure.

One of the objects of this invention is to provide a coupling which embodies novel fluid pressure actuated means for releasably locking the conduits or vessels connected thereby against being disconnected while the valve means is unseated.

It is another object of this invention to provide a coupling such as described, which includes novel means responsive to seating of a valve to vent to the atmosphere the fluid pressure that has actuated the locking means, thereby releasing the locking means whereby the conduits or vessels joined by the coupling may be disconnected from one another.

In oil fields, oil refineries, and systems for the transmission and storage of fluid under pressure, it is the practice to install numerous pressure gauges at various locations in the lines, conduits and vessels containing the fluid under pressure. At prescribed times it is the custom for an operator or attendant to read these gauges to ascertain the pressures at such various locations.

In consideration of the above noted practice it is an important object of this invention to provide coupling means which makes it possible to employ a single portable gauge for selectively taking readings at various locations in pipe lines, conduits and vessels of systems for the transmission and storage of fluid under pressure.

Accordingly, a coupling embodying the present invention includes a pair of complimentary coupling members or fittings having means cooperable to effect a quick-detachable connection thereof. One of these coupling members is preferably provided with manually operable valve means for controlling the flow of fluid through the coupling. In addition, these members cooperably provide in association with the means for detachably connecting them one to the other, a fluid pressure actuated means which locks the members against being disconnected while the valve means is unseated. Also preferably embodied in the coupling is means which, upon seating of the valve means, will vent to the atmosphere the pressure which actuated the locking means, thereby releasing the locking means so that the coupling members may be disconnected from one another.

In the use of coupling means embodying this invention, for temporarily connecting a portable gauge at various points in pipe lines, conduits and vessels such as described, a plurality of the coupling members having the valve means embodied therein are permanently installed at various points in such lines, conduits or vessels where it is desired to take pressure readings. The arrangement for taking these readings is completed by fixing to a suitable portable gauge a companion coupling member embodying means providing for quick-detachable connection thereof with any one of the permanently installed valved coupling members. When such a connection is made, the operator unseats the valve means, thereby actuating the gauge which is locked against removal while the valve means is unseated. Upon seating the valve means, the venting means provided in the coupling, relatives to the atmosphere the pressure trapped in the gauge and coupling member, thereby releasing the pressure actuated locking means whereby the coupling member fixed to the gauge together with the latter may be detached from the valved coupling member.

This invention possesses many other advantages and has other objects which may be made more easily apparent from a consideration of one embodiment of the invention. For this purpose there is shown one form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

FIG. 1 is an elevational view of a valved coupling device embodying the present invention as it would appear when employed to connect a pressure gauge with a conduit or vessel or fluid under pressure;

FIG. 2 is an enlarged vertical sectional view, partly in elevation, of the coupling shown in FIG. 1 as it would appear with the valve seated and the pressure actuated locking means in releasing position;

FIG. 3 is a vertical sectional view of the coupling shown in FIG. 2 as it would appear with the valve unseated and the locking means operative to lock the coupling members against being disconnected;

FIG. 4 is a cross sectional view taken on the line 4—4 of FIG. 1;

FIG. 5 is a cross sectional view taken on the line 5—5 of FIG. 3; and

FIG. 6 is a fragmentary perspective view of a part of one of the coupling members which provides a part of the fluid pressure actuated means for locking the two coupling members together.

With reference to the accompanying drawing, it will be seen that a coupling embodying the present invention comprises a valved coupling member 7 and companion coupling member 8 constructed and arranged for effecting a quick detachable connection between pipes, conduits, or vessels containing fluid under pressure. As here shown, the valve coupling member 7 has a screw threaded connection with a pipe line or vessel, not shown, by means of fittings A, whereas the coupling member 8 is threadedly connected with the pressure gauge B. With this application of the coupling, the gauge B may be quickly and easily connected with and disconnected from the pipe line or vessel.

In systems for storing and conducting fluid under pressure wherein numerous pressure gauges are installed at various locations to provide for pressure readings at such points, an appreciable saving in installation and operation costs may be effected by permanently installing a plurality of the valve coupling members 7 at such locations in place of the gauges and by using a single gauge to which is fitted one of the companion coupling members 8. With this arrangement an operator or attendant may effect a quick detachable connection of the gauge with any one of the valved coupling members 7. When the gauge is connected in this manner, the valved coupling member 7 is operated to open the valve means therein, whereupon the gauge will be operated to indicate the pressure at the location of the member 7.

Responsive to the opening of the valve means, a fluid pressure operated locking means embodied in the coupling members 7 and 8, as will be hereinafter described, will operate to prevent disconnection of the coupling members while the valve is unseated. When the valve means is seated, pressure-relieving means in the member 7 operates to vent to the atmosphere the pressure which actuated the locking means, thereby releasing the locking means for quickly and easily detaching the coupling member 8 and gauge from the coupling member 7.

The coupling member 7 is formed of two relatively movable parts which comprise a body 9 and what may be termed a valve member 10, which latter, however, at its outer end, is provided with a female coupling element 11 for reception of a male coupling element 12 on the companion coupling member 8.

The body 9 has a through bore 9a in which is disposed for axial movement, a reduced portion 10a of the valve member 10. The reduced portion 10a has a screw threaded connection at 14 with the member 9 whereby upon rotative movement of the valve member 10 a conical valve element 10b on the lower end of the reduced portion 10a may be moved into and out of seated engagement with an annular valve seat 9b in the bore 9a.

The valve member 10 also has a through bore 10c leading from a port 10d axially spaced from the valve element 10b, to a counterbore 10e forming a part of the coupling element 11. When the valve element 10b is seated, the flow of fluid through the body 9 and valve member 10 is shut off. When the valve element is unseated, the port 10d and bores 9a and 10c in the members 9 and 10 are open to flow of fluid from the fittings A into the counterbore 10e. When the coupling member 8 is coupled to the coupling member 7 and the valve means in the latter is unseated, the fluid will flow from the counterbore 10e through passage 8a in member 8 into the gauge B, thereby actuating the gauge. At this time the locking means which will be hereinafter described, is actuated by the fluid pressure to lock the coupling members 7 and 8 against being disconnected.

The two relatively movable parts of the coupling member 7, namely the body 9 and the valve member 10, are maintained in assembled relation by means of a split band 16 which embraces the members 9 and 10 and is formed of two semi-circular sections 16' held together by a snap ring 17. Complementary flanges 18 on the sections 16' of the band 16 overlap a flange 19 on the outer end of the body 9, while similar flanges 20 on the sections 16' overlie a flange 21 on valve member 10, thereby holding the members 9 and 10 subject to limited relative axial movement. The flanges 18 and 20 are axially spaced to permit of sufficient axial movement of the valve member 10 to seat and unseat the valve element 10b. This arrangement is such that when the valve member 10 is rotated and thereby moved axially to fully unseat the valve element 10b as shown in FIG. 3, the flange 21 will abut the flanges 20 on the band, thereby limiting such movement of the valve member.

The outer end of the valve member 10 is provided with angularly related faces 11a for engagement with a wrench or suitable tool for turning the valve member 10 to seat and unseat the valve element 10b.

The female coupling element 11 embodies the counter bore 10e, another counterbore 10f and a groove 10g extending transversely of the outer end of the member 10. These counterbores and the groove form an outwardly facing annular shoulder 10h and a pair of inwardly facing outer shoulders 10j axially spaced from the shoulder 10h on opposite sides of the groove 10g.

The male coupling element 12 on the coupling member 8 includes a coaxial reduced extension 8c of the member 8 which is adapted to be positioned in the female coupling element 11 and turned about its axis to dispose a pair of laterally extending flanges 8d thereof between the annular shoulder 10h and the two shoulders 10j, as shown in FIGS. 3, 4, and 5. When thus positioned, the coupling members 7 and 8 are restrained against such relative axial movement as will separate them, but are permitted limited relative axial movement and are subject to rotative movement until locked. In placing the extension 8c in the female coupling element 11, the flanges 8d are aligned with the groove 10g, whereby the extension may be moved freely into the female element to dispose the flanges 8d upon the annular shoulder 10h inwardly of the opposed shoulders 10j in a position such that a short turning movement of the member 8 about its axis will bring the flanges between said shoulders.

Locking means is provided to prevent the coupling member 8 from being turned about its axis and thereby moving the flanges 8d from between the shoulders 10h and 10j into position such that the coupling members may be uncoupled while the valve element 10b is unseated. This locking means operates responsive to pressure of the fluid in the coupling incident to unseating of the valve element 10b, and includes a pair of locking shoulders 8e formed on the sides of the extension 8c on which the flanges 8d are provided. These locking shoulders 8e are adapted to engage the axially extending opposed walls 10k formed by the groove 10g and when so engaged will restrain the valve member 10 from being turned about its axis.

The locking engagement of the shoulders 8e with the walls 10k will take place when the valve element 10b is unseated and the fluid pressure against the extension 8c causes the latter to move axially outward into the position shown in FIG. 3. The axial spacing of the outer shoulders 10j from the annular inner shoulder 10h permits of the axial movement of the extension 8c into and out of the aforesaid locking position. A packing ring 24 is carried by the extension 8c so as to engage the wall of the counterbore 10e, whereby the extension will act as a piston responsive to fluid pressure, this ring also preventing leakage of fluid between the extension 8c and the wall of the counterbore 10e.

A pair of axially spaced packing rings 25 and 26 are carried by the reduced portion 10a of the valve member 10 so as to engage the wall of the bore 9a to prevent leakage between this reduced portion and the wall of the bore 9a when the valve is unseated.

To provide for relieving to the atmosphere the fluid pressure which is trapped in the coupling when the valve element 10b is seated, a bleed port 27 is formed in the body 9 so that the inner end thereof opens into the bore 9a between the packing rings 25 and 26 while the outer end opens to the atmosphere. However, the packing rings 25 and 26 are located so that when the valve element 10b is seated, the packing ring 25 will be disposed in an enlargement 28 of the bore 9a and thereby become ineffective as a seal while the packing ring 26 is spaced outwardly from the port 27 and forms the desired seal. Thus, the fluid pressure trapped in the coupling when the valve element 10b is seated, will escape through the port 10d, into the bore 9a above the valve seat 9b, thence between the screw threads 14 into the enlargement 28 and pass between the body 9 and the reduced portion 10a to the atmosphere through the bleed port 27. When this pressure is relieved, the reduced extension 8c will either gravitate or may be manually moved inwardly to move the locking shoulders 8e from locking engagement with the walls 10k, whereby the member 8 may be turned about its axis to move the flanges 8d out of locked engagement with the shoulder 10j so that the member 8 and gauge thereon may be removed from the coupling member 7.

It will now be apparent that the present invention provides a novel and highly efficient self-locking coupling adapted for a safe and advantageous use for effecting a quick detachable connection between various conduits and vessels containing fluid under high pressures. Accordingly, it is to be understood that the coupling may be put to many uses other than here shown and described and wherein it is desired that the coupling members will be automatically locked against uncoupling by fluid pressure responsive means when valve means therein is manually unseated, and wherein it is desired that the flow of fluid into the coupling must be positively shut off and the trapped fluid therein relieved to the atmosphere before the coupling members may be uncoupled.

I claim:

1. In a coupling, a pair of coupling members having flow passages communicable when said members are coupled to one another; elements on said coupling members cooperable upon movement of one coupling member into a predetermined position relative to the other coupling member for holding said coupling members coupled; said one coupling member when in said position being subject to manual rotation in either direction out of said predetermined position as well as subject to fluid pressure-effected movement axially of said other coupling member responsive to fluid pressure in the passage in said other coupling member; one of said coupling members having a body of non-circular cross section; and the other member having a non-circular opening axially spaced from said elements said non-circular body and opening providing means engageable to lock said one coupling member against being rotated in either direction out of said predetermined position responsive to fluid-pressure effected axial movement of said one coupling member.

2. In a coupling: a pair of coupling members having flow passages communicable when said members are coupled to one another; one of said members having a groove extending across an end thereof and forming a pair of opposed laterally spaced shoulders extending axially in the flow passage of said one member; said passage in said one member being enlarged at a point inwardly of said shoulders and providing at inner and outer extremities of the enlargement, opposed shoulders axially spaced from one another and extending laterally of the first named shoulders; the other coupling member having a portion extensible through said groove into said enlargement for rotative and axial movement in the enlargement; a pair of laterally extending flanges on said portion movable into and out of a position between said laterally extending shoulders upon rotative movement of said portion; said flanges when between said laterally extending shoulders permitting limited relative movement between said coupling members; said portion having axially extending shoulders on opposite sides thereof spaced axially outwardly from said flanges for engaging said first named shoulders to prevent rotation of said portion upon said limited axial movement of said portion in one direction; and means on one of said coupling elements engageable with the other coupling element at a point inwardly spaced from said flanges for forming a fluid tight seal between the coupling members.

3. In a coupling: a female coupling member having a flow passage therethrough and provided at one end with a transversely extending groove forming a pair of opposed laterally spaced shoulders extending axially in said passage; said passage being enlarged at a point inwardly of and contiguous with said shoulders; said enlargement providing at inner and outer extremities thereof opposed shoulders axially spaced from one another and extending laterally of the first named shoulders; a male coupling member having a flow passage therethrough; said male coupling having a portion extensible through said groove into said enlargement for rotative and axial movement therein; a pair of laterally extending flanges on said portion movable into and out of a position between said laterally extending shoulders upon rotation of said portion; said flanges when between said laterally extending shoulders permitting limited relative movement between said coupling members; said portion having shoulders axially spaced from said flanges engageable with the first named shoulders to prevent rotation of said portion when said portion is at a limit of its axial movement relative to said female coupling member; and means operable when said members are coupled to one another forming a fluid tight seal between said portion and said passage in said female member at a point inwardly spaced from said enlargement.

References Cited in the file of this patent

UNITED STATES PATENTS

| | | |
|---|---|---|
| 1,232,193 | Bowes | July 3, 1917 |
| 1,309,830 | Wanamaker | July 15, 1919 |
| 1,393,908 | Rudolph | Oct. 18, 1921 |
| 1,430,558 | Jimerson | Oct. 3, 1922 |
| 2,571,641 | Wing | Oct. 16, 1951 |
| 2,712,458 | Lipson | July 5, 1955 |